US012756679B2

(12) United States Patent
Hager et al.

(10) Patent No.: US 12,756,679 B2
(45) Date of Patent: Oct. 6, 2026

(54) SYSTEMS AND METHODS FOR PERFORMING COMPATIBILITY CHECKS OF ELECTRONIC MESSAGES WITH SPECIFIC APPLICATIONS

(71) Applicant: retarus GmbH, Munich (DE)

(72) Inventors: Martin Hager, Munich (DE); Michael Grauvogl, Munich (DE)

(73) Assignee: retarus GmbH, Munich (DE)

( * ) Notice: Subject to any disclaimer, the term of this patent is extended or adjusted under 35 U.S.C. 154(b) by 0 days.

(21) Appl. No.: 18/432,602

(22) Filed: Feb. 5, 2024

(65) Prior Publication Data

US 2024/0297860 A1 Sep. 5, 2024

(30) Foreign Application Priority Data

Mar. 1, 2023 (EP) .................................... 23159335

(51) Int. Cl.
*H04L 51/063* (2022.01)
*H04L 51/066* (2022.01)

(52) U.S. Cl.
CPC .......... *H04L 51/063* (2013.01); *H04L 51/066* (2013.01)

(58) Field of Classification Search
CPC ..... H04L 51/06; H04L 51/063; H04L 51/066; H04L 51/212; H04L 67/565
See application file for complete search history.

(56) References Cited

U.S. PATENT DOCUMENTS 9,451,427 B1 * 9/2016 Hoelzle .................. H04W 4/14
11,171,906 B1 * 11/2021 Ledet ...................... H04L 51/18
2002/0198948 A1 12/2002 Lin
2004/0078580 A1 * 4/2004 Hsu ...................... H04L 63/145 713/188
2004/0266411 A1 * 12/2004 Galicia .................. H04W 4/18 455/412.2
2005/0138210 A1 * 6/2005 Shkvarchuk ............ H04L 69/22 709/246

(Continued)

FOREIGN PATENT DOCUMENTS

GB 2 430 335 A 3/2007
JP 2016197879 A 11/2016

OTHER PUBLICATIONS

Extended European Search Report dated Aug. 4, 2023 in EP Application No. 23159335. 1-1216, 8 pages.

(Continued)

*Primary Examiner* — Johnny B Aguiar
(74) *Attorney, Agent, or Firm* — Andrew M. Calderon; Calderon Safran & Wright P.C.

(57) ABSTRACT

A method of providing electronic messages is provided. The method is performed by a messaging server and comprises the following steps: receiving an electronic message from a first communication entity; determining whether the electronic message is intended for a user or a specific application at a second communication entity; if the electronic message is found to be intended for a specific application at the second communication entity, checking whether the electronic message can be processed by the application at the second communication entity; and providing the electronic message to the second communication entity if it is found that the electronic message can be processed by the application of the second communication entity.

15 Claims, 3 Drawing Sheets

(56) References Cited

U.S. PATENT DOCUMENTS

| | | | | |
|---|---|---|---|---|
| 2007/0271341 | A1* | 11/2007 | Kumar | G06Q 10/107 709/206 |
| 2007/0298770 | A1* | 12/2007 | Lee | H04W 4/12 455/412.2 |
| 2008/0215694 | A1* | 9/2008 | Chen | H04L 51/56 709/206 |
| 2010/0169424 | A1* | 7/2010 | Gustafsson | H04L 51/56 709/206 |
| 2014/0040405 | A1* | 2/2014 | Stafford | H04L 51/06 709/206 |
| 2016/0285790 | A1* | 9/2016 | Szeto | G06Q 30/0631 |
| 2017/0264576 | A1* | 9/2017 | Mostafa | H04L 51/063 |
| 2022/0255892 | A1 | 8/2022 | Schnitt | |

OTHER PUBLICATIONS

Technique for Communicating Electronic Messages issued on Mar. 1, 2023, in corresponding Application No. 23 159 335.1, EPAE-140353, 26 pages.

EPO Communication under Rule 71(3) EPC issued Jun. 22, 2026, in corresponding Application No. 23 159 335.1-1206, EPAE-140353, 8 pages.

* cited by examiner

SYSTEMS AND METHODS FOR PERFORMING COMPATIBILITY CHECKS OF ELECTRONIC MESSAGES WITH SPECIFIC APPLICATIONS

CROSS-REFERENCE TO RELATED APPLICATIONS

The present application claims priority under 35 U.S.C. 119(b) to EP 23 159 335.1, filed on Mar. 1, 2023, the contents of which are incorporated by reference in their entirety herein.

TECHNICAL FIELD

The present invention relates generally to communication technology. In particular, the invention relates to a technique for providing electronic messages within a communication network.

BACKGROUND

Electronic messages, such as electronic mail messages (or emails), are most commonly used these days for exchanging information with one another. In particular, emails are often used in connection with business activities, such as advertising, sales activities, invoicing, and so on.

In principle, emails can be classified depending on their content and/or depending on who is generating the emails and for whom the generated emails are intended. For instance, there are known emails that are generated individually by people at a sender device and intended for other people at a recipient device.

In connection with business activities there are further known emails that are generated in an automated way by a corresponding application/software related to a business process at the sender device and intended for specific people or specific application(s) related to specific business process (es) at the recipient device. Examples for such automated emails are transactional emails that are generated and sent in response to an action/request of a user or an application (process) at the recipient device (for instance, a password reset email in response to a password reset request, an account creation email in response to an account creation request, an order confirmation email in response to an order, a shipping confirmation email in response to a shipping order, emails related to invoices in response to a purchase, etc.). Other examples for automated emails are marketing emails that comprise content intended for a large number of recipient devices at the same time. Examples for such marketing emails are newsletters, limited time offers, sales campaigns, vouchers, and so on. The content of such automated emails is typically related to a commercial purpose.

It is evident that automated emails related to business processes are exchanged in large numbers and information associated with such automated emails may get unintentionally lost. For instance, it is conceivable that automated emails exceeding a certain traffic limit are simply discarded without further notice. It is further conceivable that information of automated emails gets lost because emails are not processed by an appropriate application at the recipient device for which the emails were intended, or because the content and/or attachment(s) of the emails is/are erroneous, or the format of the emails and/or attachment(s) cannot be appropriately processed. In all these cases the content of the emails may get entirely or at least partially lost. Moreover, applications at the recipient device may be disturbed or crashed when processing such emails. These problems are not limited to emails and may arise with any other type of electronic messages.

Accordingly, there is a need to provide an improved messaging technique, in particular an improved messaging server platform, that overcomes the above-mentioned problems with the delivery of large numbers of automated messages.

SUMMARY

According to a first aspect of the invention, a method of providing electronic messages is provided, wherein the method is performed by a messaging server and comprises the following steps: receiving an electronic message from a first communication entity; determining whether the electronic message is intended for a user or a specific application at a second communication entity; if the electronic message is found to be intended for a specific application at the second communication entity, checking whether the electronic message can be processed by the application at the second communication entity; and providing the electronic message to the second communication entity if it is found that the electronic message can be processed by the application at the second communication entity.

In the present disclosure the term “electronic message” may encompass any type of message that can be exchanged between two or more electronic communication entities. More specifically, the electronic message may be an automated electronic message generated by a corresponding application or software tool at the first communication entity and intended for a user and/or an application or software tool at the second communication entity (for instance, an application related to a business process, such as an invoice processing application or order processing application). The electronic message according to the invention may be an electronic mail message (in short email), an instant message, an Electronic Data Interchange (EDI) message (i.e., a message generated in accordance with the United Nations/Electronic Data Interchange for Administration, Commerce, and Transport (UN/EDIFACT) standard) or any other type of electronic message. In the present disclosure the singular term “electronic message” does not only refer to a single electronic message (e.g., a single email), but also encompasses a plurality (i.e., a large number) of electronic messages (e.g., emails) that can be generated by a corresponding application (or software tool) at the first communication entity in an automated way.

The first communication entity may be a (distributed) computer system, a computer terminal or any other message sender device configured to generate and send electronic messages automatically and/or upon user input, such as a smartphone, a tablet, a personal computer and/or any other private or corporate computer device. In a similar way, the second communication entity may be a (distributed) computer system (e.g., a company computer system), a computer terminal or any other message receiving device configured to receive and process electronic messages automatically and/or upon user input, such as a smartphone, a tablet, a personal computer and/or any other private or corporate computer device. Hence, both communication entities may be electronic communication entities, wherein the first communication entity may act as message sending device and the second communication entity may act as message receiving device. In the following the first communication entity is also referred to as message sending device, and the second communication entity is also referred to as message receiving device.

With "specific application" a software tool or software module (i.e., software routines) may be meant which is run by the second communication entity and designed for processing an electronic message or content of the electronic message in a desired way. It should be clear that for each type of content a specific application (specific software tool or software module) capable of processing that specific type of content may be provided at the second communication entity. For instance, message content related to business processes, such as quotations, orders, invoices etc., should be provided to corresponding applications at the second communication entity capable of processing that specific content in a desired way.

The message received at the messaging server may be a message intended for a specific user or a specific application at the second communication entity. The step of determining whether the electronic message is intended for a specific user or a specific application at the second communication entity may comprise the sub-steps of analysing the electronic message received from the first communication entity, and classifying, based on the analysis result, the electronic message as a message intended for a user or as a message intended for a specific application at the second communication entity.

This analysis of the electronic message may comprise an analysis of the header information of the received electronic message, the content of the electronic message and/or the attachment(s) of the electronic message. The analysis of the message header information may comprise an analysis of the message address(es) of the message sending device (the first communication entity) and/or the message receiving device (the second communication entity). For instance, it may be analysed whether the message address(es) comprise(s) an address portion which can be associated with a specific name of a user or a specific application at the message receiving device.

The analysis of the message body may comprise determining the type of content (for instance, whether the content relates to specific business processes, such as a quotation, order, invoice, etc.,) and/or the format of the content (for instance, whether the content is provided in the form of text, graphics and/or lists) in the message body. The analysis of the message body may further comprise a search for one or more specific features in the content of the body (such as, an order number, invoice number, shipping number, etc.) that can be associated with a specific business process and therefore with a specific application capable of processing such content.

If the message comprises an attachment, the attachment may be additionally analysed. In particular the format of the attachment is determined by analysing the file name and/or file extension of the attachment. The analysis of the attachment may further comprise determining the type of content in the attachment (e.g., whether the content relates to a specific business process) and/or searching for one or more specific features (such as, an order number, invoice number, shipping number, etc.) in the content of the attachment that can be associated with a specific business process and therefore with a specific application capable of processing such content.

Since automated messages related to business processes are usually associated with specific message addresses or specific file names and/or specific file extensions of the message attachment(s), it may be sufficient to (only) analyse the message header information and/or the message attachment(s). However, should such an analysis not be sufficient for classifying the received message as a message intended for a specific user or a message intended for a specific application at the second communication entity, the content of the message body may be additionally analysed in terms of its type and format as described above.

Thereafter, the message may be classified as a message intended for a user if the above-described analysis leads to the result that the message may comprise a content related to a specific user. Otherwise, the message may be classified as a message intended for a specific application if the above-described analysis leads to the result that the message may comprise a content related to a specific business process that can be processed by a specific application in an automated way.

If the electronic message is found to be a message intended for an application, the method may further check whether the message or message content is sufficiently compatible with that specific message processing application. Sufficiently compatible with the intended message processing application may mean that the message can be processed correctly by the application, i.e., the application will not be disturbed or crashed when trying to process the message (message content). This compatibility check may comprise a check whether the format of the message (e.g., email message, EDIFACT message, etc.), the format of an attachment, if any, and/or the type of content of the message and/or attachment, if any, is compatible with the processing requirements of the application for which the message is intended.

If this electronic message check has revealed that the message cannot be correctly processed by the message processing application (for instance, because the message format, the attachment format and/or the type of content is (are) not compatible with the processing requirements of the message processing application), the message may be pre-processed by the messaging server in such a way that the electronic message becomes processable by the application at the second communication entity. This pre-processing of the electronic message may comprise converting the electronic message and/or the attachment of the electronic message into an electronic message having a message format and/or attachment format that can be processed by the application.

Additionally or alternatively, the pre-processing of the electronic message may comprise converting the content of the electronic message and/or attachment of the electronic message into a least one data object that can be easily processed by the application. For instance, it is conceivable that an email message in the Multipurpose Internet Mail Extensions (MIME) format is converted into a data object (for instance, JavaScript Object Notation (JSON) data object) comprising the content of this email.

The above-described pre-processing of the electronic message at the messaging server may not be limited to messages which have been found to be not sufficiently compatible with a message processing application for which the message is intended. The pre-processing may be performed for any message received by the messaging server with the purpose to make the content of the message more easily accessible to the message processing application.

The step of providing the electronic message to the second communication entity may comprise providing the received electronic message and/or the pre-processed electronic message to the message processing application for which the message is intended. More specifically, the electronic message is provided to the message processing application after the above-described determining step has revealed that the electronic message is intended for that specific application. Moreover, the message may only be provided to the application if the above-described message checking step has revealed that the electronic message can be processed by that application. If the message checking step has revealed that the received message cannot be processed correctly by the message processing application, the pre-processed message is provided to the application instead. Alternatively, the at least one data object comprising the content of the received electronic message may be provided to the message processing application.

The step of providing the electronic message may further comprise providing the electronic message to a user at the second communication entity if the above-described determining step has revealed that the electronic message is intended for a user.

According to one implementation, the electronic message may be provided by pushing the electronic message and/or the pre-processed electronic message to the second communication entity. In such a case the messaging server implements a Push scheme (e.g., Simple Mail Transfer Protocol (SMTP)-Push; Representational State Transfer (REST)-Push) for providing the electronic message to the application. According to another implementation, it is also conceivable that the electronic message may be retrieved by the second communication entity from the messaging server. In this case the messaging server implements a Pull scheme (e.g., Post Office Protocol (POP)-Pull) for providing the electronic message to the application.

Further, the method may comprise storing the electronic message and/or pre-processed electronic message at the server for a predetermined period of time. By storing the electronic message and/or the pre-processed electronic message it is avoided that automated electronic messages get lost during communication or when the messages cannot be appropriately processed at the second communication entity.

The method may further comprise monitoring the sending status of the electronic messages. For instance, it may be monitored whether electronic messages are pulled by the second communication entity within a specific period of time. If the electronic messages are not pulled within that specific period of time, a notification message may be sent to the second communication entity.

Still further, the method may comprise subjecting the incoming electronic message to an antivirus security check. Such an antivirus security check may comprise a virus signature check, sand boxing or any other type of malicious behaviour check. The antivirus check may be performed by the messaging server. In case the message is determined to be suspicious or malicious, the electronic message may be blocked and/or quarantined by the messaging server. In addition, a notification may be sent to the second communication entity for which the message was intended.

The electronic message according to the invention may be a transactional message or an advertising message. In particular, the electronic message may be an electronic mail message (email).

According to a second aspect of the invention a computer program product is provided, which comprises program code portions for carrying out the above-described method, when the computer program product is executed on a computer device, such as a messaging server. The computer program product may be stored on a (non-transitory) computer-readable recording medium.

According to a third aspect of the invention, a messaging server is provided, wherein the messaging server is configured to provide electronic messages received from a first communication entity to a second communication entity. The messaging server comprises a first communication module configured to receive an electronic message from a first communication entity; a determining unit configured to determine whether the electronic message is intended for a user or a specific application at a second communication entity; a checking unit configured to check whether the electronic message can be processed by the application of the second communication entity if the electronic message is found to be intended for a specific application at the second communication entity; and a second communication module configured to provide the electronic message to the second communication entity if it is found that the electronic message can be processed by the application at the second communication entity.

The messaging server may be in (continuous) communication with the first communication entity via the first communication module (a message receiving module) and with the second communication entity via the second communication entity (a message sending module). The messaging server may be implemented as a single computer device or a computer system (e.g., a corporate computer system) comprising distributed computer devices which are configured to carry out the method described herein.

The messaging server may further comprise a pre-processing unit configured to pre-process the received electronic message. The pre-processing of the received electronic message may comprise converting the received electronic message into an electronic message having a message format and/or attachment format that can be processed by the application. The pre-processing of the received electronic message may further comprise generating at least one data object comprising the content of the message and/or message attachment.

The messaging server may further comprise a message storage configured to store the electronic message and/or pre-processed electronic message at the messaging server for a predetermined period of time.

The messaging server may further comprise an antivirus unit configured to subject the received electronic message to an antivirus check. Such an antivirus check may encompass a virus signature check, sand boxing or any other type of malicious behaviour check.

According to a fourth aspect of the invention, a messaging system is provided comprising a first communication entity, a second communication entity and the above-described messaging server which is in communication with the first communication entity and the second communication for performing the above described method.

BRIEF DESCRIPTION OF THE DRAWINGS

Further details, aspects and advantages of the present disclosure described herein will become apparent from the following drawings, in which.

DETAILED DESCRIPTION

In the following description, for purposes of explanation and not limitation, specific details are set forth in order to provide for a thorough understanding of the technique presented herein. It will be apparent to one skilled in the art that the disclosed technique may be practiced in other embodiments that depart from these specific details.

Figure 1:
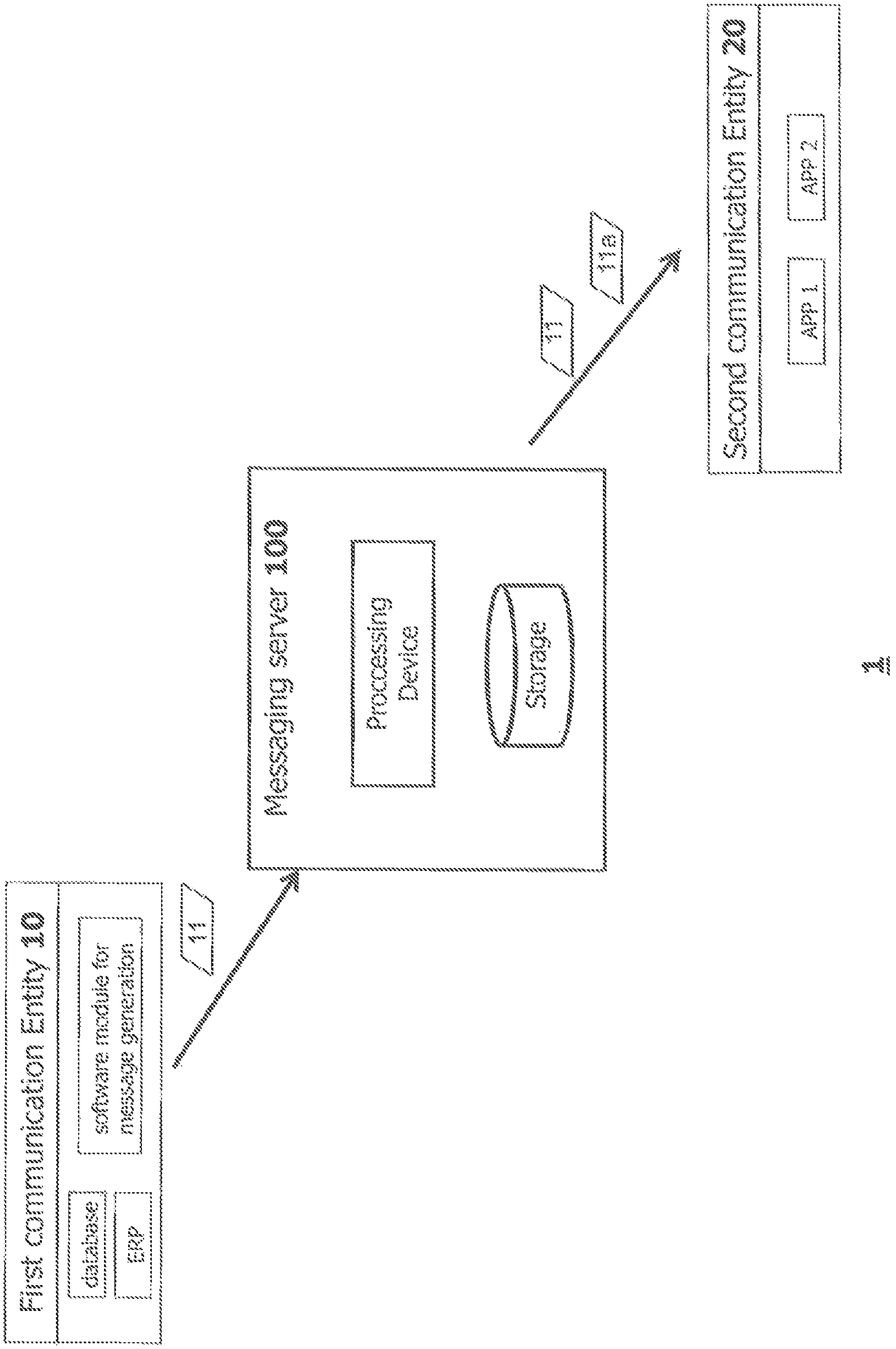
FIG. 1 is a block diagram illustrating a messaging system comprising a messaging server in communication with a first communication entity and a second communication entity for exchanging messages.

FIG. 1 illustrates, in the form of a block diagram, an exemplary embodiment of a messaging system 1 according to the invention.

The messaging system 1 comprises a messaging server 100, at least one first communication entity 10 and at least one second communication entity 20. The at least one first communication entity 10 and the at least one second communication entity 20 are in communication with the messaging server 100 via a communication network (for instance, over the internet or at least one other communication network). The functionality of the messaging server 100 is further described in connection with FIGS. 2 and 3.

The first communication entity 10 may be a (distributed) computer system (e.g., a company computer system) or a computer device that is in communication with the messaging server 100. The first communication entity 10 may comprise at least one message processing tool (e.g., a software tool) that is configured to generate at least one electronic message in an automated way based on content data, such as content data related to business processes (e.g., data related to an order).

To generate the at least one electronic message, the message processing tool may retrieve at least one address of the message receiving device for which the message is intended from an address database maintained by the first communication entity 10. Moreover, the data processing tool may retrieve corresponding content data related to a business process from a content database or an enterprise resource planning (ERP) system maintained by the first communication entity 10. The retrieved data is converted into an electronic message 11 having a specific message format. For instance, the generated message may be an electronic mail message (email) in which the content is presented in the mail body and/or in an additional attachment attached to the electronic mail message. The attachment may be presented in a specific file format, such as pdf-format, xlsx-format, docx-format, csv-format etc. However, the present disclosure is not limited to electronic mail messages and other message formats are also conceivable. For instance, the message may be an EDI-message based on the UN/EDIFACT standard, or a hybrid EDI-message that supports attachments. The message generation tool may be a software tool (application) which when executed at the first communication entity 10 generates electronic messages in an automated way as described above.

The first communication entity 10 is further configured to transmit the generated electronic message 11 to the messaging server 100. For this purpose, the first communication entity 10 comprises corresponding software and/or hardware designed for transmission of the generated message 11 to the messaging server 100 (not shown in FIG. 1).

The second communication entity 20 may also be a (distributed) computer system (e.g., a company computer system) or a computer device which is in communication with the messaging server 100. The second communication entity 20 may comprise software and/or hardware configured to receive emails (via Push or Pull) from the messaging server 100. Moreover, the second communication entity 20 may comprise one or more applications (software tools or software modules indicated by application1 (APP1), application2 (APP2), in FIG. 1). Each application may be designed to process specific message content, such as content related to specific commercial activities, in an automated way.

Figure 2:
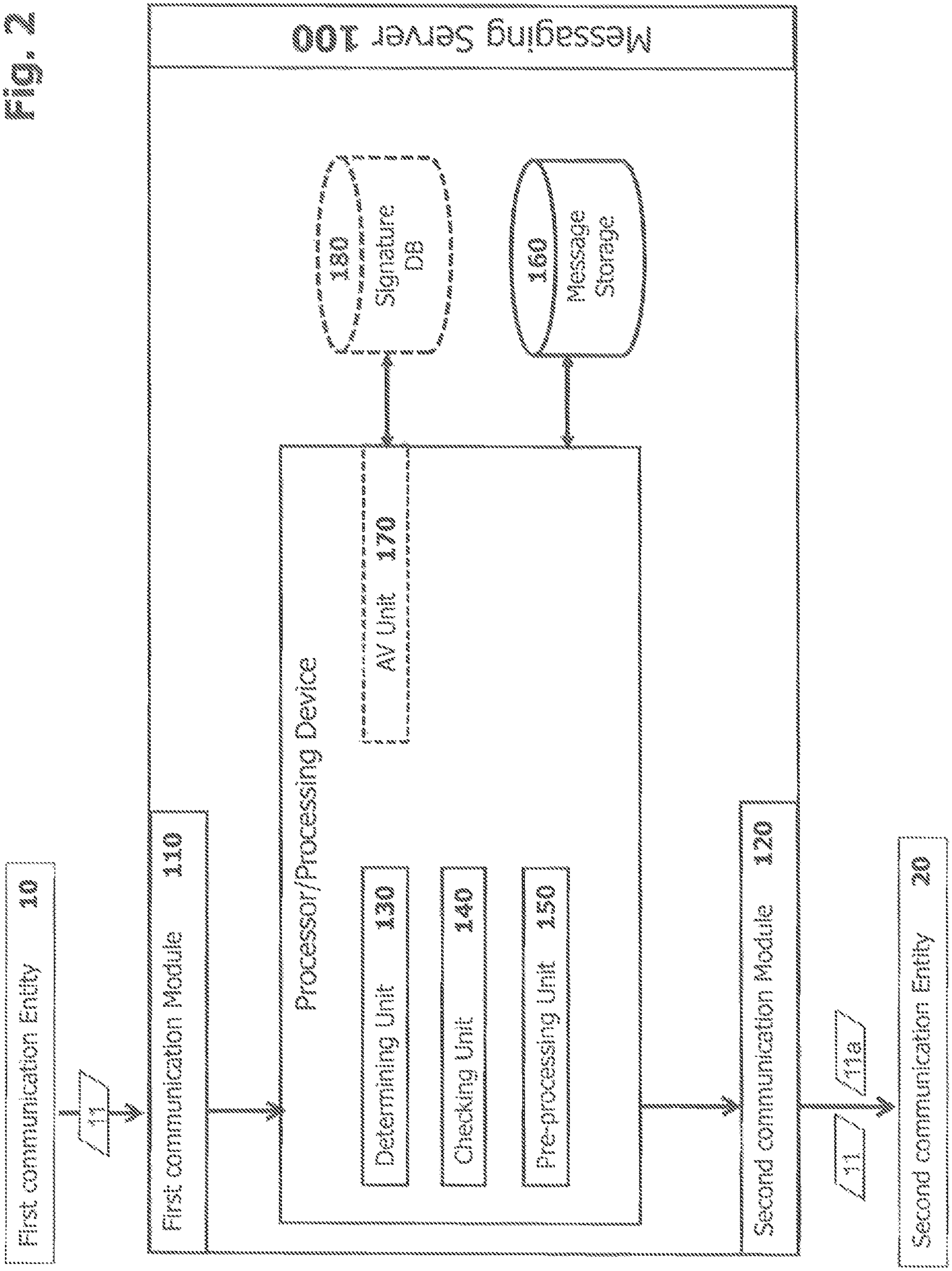
FIG. 2 is a block diagram illustrating the messaging server of FIG. 1 in more detail.

With reference to FIG. 2 the structure and functionality of the messaging server 100 is further described.

The messaging server 100 comprises a first communication module 110 via which the messaging server 100 is in communication with the first communication entity 10. The messaging server further comprises a second communication module 120 via which the server 100 is in communication with the second communication entity 20.

The messaging server 100 further comprises a determining unit 130, a checking unit 140 and a pre-processing unit 150. Still further, the messaging server 100 comprises a message storage 160 configured to store the received messages 11 for a predetermined period of time.

Optionally, the messaging server 100 may further comprise an antivirus unit (AV unit) 170. Still further, the messaging server 100 may comprise a signature database (signature DB) 180 configured to store AV signatures.

Each of the determining unit 130, checking unit 140, pre-processing unit 150, and the optional AV unit 170 may be implemented as a separate software module, hardware module or a combined software/hardware module. Alternatively, the determining unit 130, checking unit 140, pre-processing unit 150 and the optional AV unit 170 may be implemented as submodules of a commonly designed software and/or hardware module (processor/processing device), as illustrated by the box in FIG. 1. One skilled in the art will appreciate that the above-mentioned units may be implemented using software functioning in conjunction with a programmed microprocessor using an application-specific integrated circuit (ASIC), a digital signal processor (DSP) or a general-purpose computer.

Regardless of the above-mentioned implementation details, the determining unit 130 is designed to determine whether an incoming electronic message 11 is intended for a specific user or a specific application at the second communication entity 20. In case the incoming electronic message 11 is found to be a message for an application, it is determined for which application at the second communication entity 20 the message is intended. Accordingly, each incoming message at the messaging server 100 is classified as a user message or a message to be processed by a specific application at the second communication entity 20. This classification of the incoming electronic message 11 is based on a corresponding analysis of the message content (i.e., type and/or format of the message content), message header information, and/or message attachment.

If the electronic message 11 is provided to a wrong application at the second communication entity 20, the message 11 or the content of the message 11 cannot be appropriately processed by this application and there is the risk that the processing of the message 11 crashes the application and the message content gets lost. In order to avoid such problems, it is important to analyse and appropriately classify each received message 11 so that the received electronic message 11 can be provided to the right application for which the message 11 was originally intended.

The checking unit 140 is designed to further check whether the received electronic message 11 can be correctly processed by the application for which the electronic message 11 is intended. This electronic message check may comprise checking whether the electronic message 11 (e.g., its type and format), content of the electronic message 11, and/or attachment of the electronic message 11 complies with processing requirements of the application for which the message 11 is intended.

The pre-processing unit 150 is configured to pre-process the electronic message 11 such that the content of the electronic message 11 can be processed correctly or more easily by the application for which the message 11 is intended. For instance, it is conceivable that the preprocessing unit 150 converts the electronic message 11 (for instance, an email) into an aps propriate message format that can be easily read and processed by the application at the second communication entity 20. It is also conceivable that the pre-processing unit 150 generates a data object based on the content of the electronic message 11. The data object may then be provided to the application for further processing instead of the original electronic message 11. The purpose of the above described pre-processing is that the content of the electronic message 11 can be securely and easily processed by the application at the second communication entity 20 avoiding therefore a crash and/or a content loss when the message 11 is further processed at the second communication entity 20. Thus, according to the invention, the messaging server 100 does not only route messages to the appropriate application at the second communication entity 20, but may also pre-process the received electronic message 11 in such a way that the content can be easily processed at the second communication entity.

The optional antivirus unit 170 is configured to perform a malware check of the incoming electronic message. This malware check may be based on a signature check; that is, signatures of the incoming electronic message 11 are compared against malicious signatures retrieved from a signature database 180.

The message storage 160 is configured to store each incoming message 11, pre-processed message 11*a* and/or generated data object based on the message content in the messaging server 11 for a predetermined period of time (e.g., for 30 days). The storage of the message and/or pre-processed content allows for recovery of the content which otherwise would be lost if, for instance, a message 11 was not received at the second communication entity 20 or could not be processed by a corresponding application at the second communication entity 20.

Figure 3:
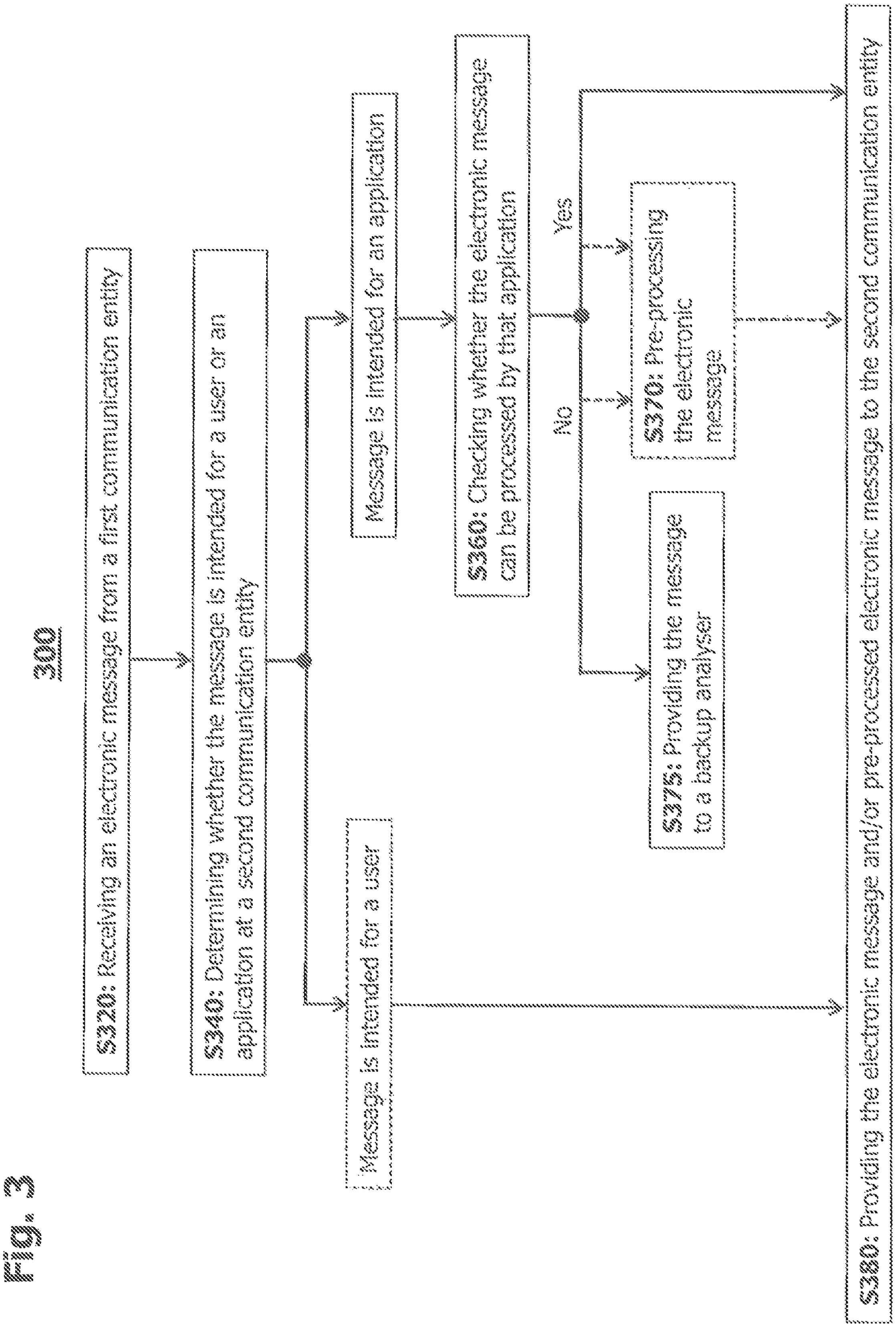
FIG. 3 is a flow diagram illustrating a method of providing electronic messages according to an exemplary embodiment of the invention.

With reference to FIG. 3, a method 300 of providing electronic messages according to the invention is further described. The method 300 is performed by the messaging server 100 described in connection with FIG. 2 above and comprises the following steps.

The method 300 starts with step S320 in FIG. 3, according to which the messaging server 100 (or more specifically, the communication module 110 of the messaging server 100) receives an electronic message 11 from the first communication entity 10. The received electronic message 11 may comprise a content related to a specific user at the second communication entity 20 or a content related to a specific business process (such as an order, a quotation, an invoice, etc.).

Accordingly, the electronic message 11 received by the messaging server 100 may be a message 11 intended for a specific user at the second communication entity 20 or a specific application capable of processing the content (business process related content) in an automated way. In particular, the message 11 may be a transactional message or a promotional message. Independent of the specific content of the electronic message 11, the message 11 may be an electronic mail message (email), an EDIFACT message or a message according to another messaging format. The present invention does not depend on the specific format of the message 11.

In a subsequent step 340 the messaging server 100 determines whether the message 11 received from the first communication entity 10 is intended for a user or an application at the second communication entity 20. This determining step is performed by the determining unit 130 of the messaging server 100. The determining step is based on an analysis of the message header, message body and/or message attachment depending on whether the received message contains such an attachment. In particular, the message addresses of the first communication entity 10 (i.e., the message sending device) and the second communication entity 20 (i.e., the message receiving device) may contain features that are indicative of a specific user or a specific application at the second communication entity 20. Additionally, or alternatively, the content of the electronic message 11 is further analysed. This analysis may comprise an analysis of the type of content (for instance, whether the content comprises information related to an invoice, an order, a quotation, or personal information related to a user) and/or the structure (format) of the content (for instance, whether the content comprises information in the form of text, graphics and/or tables). Thereafter, the electronic message 11 is classified by the determining unit 130 as a message intended for a user if the analysis of the message 11 reveals that the message comprises a content related to a specific user. Moreover, the electronic message 11 is classified as a message intended for an application at the second communication entity 20 if the analysis of the message 11 reveals that it comprises a content that can be processed by a specific application at the second communication entity 20.

If the message analysis has revealed that the electronic message 11 received from the first communication entity 10 is intended for a specific application at the second communication entity 20, the messaging server 100 further checks whether the electronic message 11 can be processed by that application at the second communication entity 20. This checking of the electronic message 11 is performed by the checking unit 140 of the messaging server 100 and may comprise a compatibility check of the message 11 with the application for which the message 11 is intended. This compatibility check may comprise a check whether the format of the message 11 (email message, EDIFACT message, etc.), the format of an attachment, if any, and/or the type of content of the message and/or attachment, if any, is compatible with the processing requirements of the application for which the message 11 is intended.

If this messaging check reveals that the electronic message 11 is sufficiently compatible with the processing requirements of the application for which the message 11 is intended, the messaging server 100 may directly provide the message 11 to that specific application at the second communication entity 20 (see 'Yes' branch in FIG. 3).

Additionally or alternatively, the electronic message 11 may be provided to the pre-processing unit 150 for pre-processing (see method step S370 which is an optional method step indicated by a dashed line in FIG. 3). The pre-processing of the electronic message 11 may comprise a conversion of the electronic message and/or the attachment of the electronic message (provided that the electronic message comprises such an attachment) into an electronic message 11*a* having a message format and/or attachment format that can be easily processed (or interpreted) by the application. According to one variant, the pre-processing may comprise a generation of a data object (e.g., a JSON data object) comprising the content (or relevant parts of the content) of the electronic message 11 and/or the attachment of the electronic message 11 and providing that data object to the application for further content processing.

In case the message check in step S360 has revealed that the electronic message 11 cannot be correctly processed by the application for which the message is intended, the message may be provided to a backup analyser at the second communication entity 20 (see step S375 and 'No' branch in FIG. 3) instead of to the application for which the message was originally intended. Such a situation may occur if, for instance, the message format or attachment format is not compatible with the processing requirements of the application at the second communication entity 20 or the message content may comprise errors. By providing the message 11 to a backup analyser and avoiding that the message will be processed by the application it is avoided that relevant content gets lost and/or the message processing application is crashed.

Additionally or alternatively, such a message 11 may be provided to the pre-processing unit 150 which may convert the message or attachment in an appropriate format that can be processed by the message processing application or may eliminate errors that harm the message processing.

In the last step S380 the messaging server 100 provides (via the second communication module 120) the electronic message 11 and/or the pre-processed electronic message 11*a* to the second communication entity 20. That is, if the message 11 is classified as message intended for a user, the message is directly provided to the user (a corresponding mailbox associated with the user) at the second communication entity 20. If the electronic message 11 is classified as message intended for a specific application, the electronic message 11 itself or the associated pre-processed electronic message 11*a* is provided to that specific application at the second communication entity 20.

As already outlined above, message 11 received at the messaging server 100 may comprise different types of content which may be related to different types of business processes and which may be processed in an automated way by different applications (software tools) at the second communication entity 20. Accordingly, the step of providing the electronic message 11 and/or pre-processed electronic message 11*a* to the second communication entity may involve a content-specific provisioning of the electronic message 11 to that application at the second communication entity, which is able to process the content in the electronic message 11 in a desired way.

Moreover, the electronic message 11 and/or pre-processed electronic message 11*a* may be provided to the user or the application at the second communication entity 20 according to a push scheme (that is, the message 11 and/or pre-processed electronic message 11*a* is pushed to the user or application at the second communication entity 20) or a pull scheme (that is, the message 11 and/or pre-processed electronic message 11*a* is retrieved from the messaging server 100 by the second communication entity 20) in regular time intervals.

The above-described technique for providing electronic messages has many advantages over conventional techniques. For instance, messages having a content that is intended for specific applications for automated message processing is selectively routed to those applications which are able to process the content of the messages in an appropriate way. Further, by checking the content and format of the electronic messages it can be avoided that messages are provided to wrong applications or applications that are not able to (fully) process the message content. Moreover, if it is found that a message is not processable by an application for which the message is intended, the message will be routed to a backup analyser at the second communication entity for review. Hence, the present technique avoids that message content gets lost or message processing applications are crashed during automated message processing.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The ivnention claimed is:

1. A method of providing electronic messages, the method being performed by a messaging server and comprising:

receiving an electronic message from a first communication entity, the electronic message being an automated electronic message generated by a software tool at the first communication entity and related to a business transaction;

determining the electronic message is intended for a specific application at a second communication entity;

the electronic message being found to be intended for the specific application at the second communication entity, checking whether the electronic message is processable by the specific application at the second communication entity;

classifying the electronic message as a message intended for the specific application at the second communication entity upon determining that content of the electronic message is processable by the specific application at the second communication entity, the classifying being based at least on analyzing a type of content and specific features related to the business transaction present in an attachment and message body of the electronic message;

checking that the electronic message is processable by the specific application at the second communication entity, the checking comprising a compatibility check of the electronic message with the specific application for which the electronic message is intended;

pre-processing the electronic message to be processed by the specific application, wherein the pre-processing of the electronic message is performed after the checking of the electronic message reveals that the received electronic message will not be correctly processed by the specific application or will disturb or crash the specific application during message processing; and providing the pre-processed electronic message to the second communication entity.

2. The method according to claim 1, wherein the pre-processing of the electronic message comprises converting the electronic message into an electronic message having a message format that is processed by the specific application.

3. The method according to claim 1, wherein the pre-processing of the electronic message comprises converting content of the electronic message into at least one data object that is capable of being processed by the specific application.

4. The method according to claim 1, wherein the determining whether the electronic message is intended for the specific application at the second communication entity comprises analysing header information of the electronic message, the content of the electronic message and/or the attachment of the electronic message.

5. The method according to claim 1, wherein the checking of the electronic message comprises checking whether the electronic message, the content of the electronic message and/or the attachment of the electronic message complies with processing requirements of the specific application for which the electronic message is intended.

6. The method according to claim 1, wherein the providing step comprises providing the pre-processed electronic message to the specific application after the electronic message is determined to be intended for the specific application and/or the electronic message is checked as being processable by the specific application at the second communication entity.

7. The method according to claim 1, wherein the pre-processed electronic message is provided as at least one data object comprising content of the electronic message to the specific application.

8. The method according to claim 1, wherein the providing step comprises pushing the pre-processed electronic message to the second communication entity by implementing a Push scheme comprising a Simple Mail Transfer Protocol (SMTP)-Push or a Representational State Transfer (REST)-Push.

9. The method according to claim 1, wherein the providing step comprises providing the pre-processed electronic message to be retrieved by the second communication entity by implementing a Pull scheme comprising a Post Office Protocol (POP)-Pull.

10. The method according to claim 1, wherein the pre-processed electronic message is/are stored by the messaging server for a predetermined period of time.

11. The method according to claim 1, wherein the method further comprises subjecting the electronic message to an antivirus security check.

12. The method according to claim 1, further comprising monitoring a sending status of the pre-processed electronic message to determine that the pre-processed electronic message is pulled by the second communication entity within a specific period of time and sending a notification message to the second communication entity due to the pre-processed electronic message not being pulled within the specific period of time.

13. A computer program product comprising a non-transitory computer-readable recording medium storing program code portions for carrying out the method according to claim 1, wherein the computer program product is executed on a computer device comprising the messaging server.

14. The messaging server configured to provide the electronic messages received from the first communication entity to the second communication entity, wherein the messaging server is configured to perform the method according to claim 1.

15. A messaging system configured to exchange the electronic messages, the messaging system comprising:

the first communication entity;

the second communication entity; and the messaging server wherein the messaging server is in communication with the first communication entity and the second communication entity and configured to carry out the method of claim 1.

* * * * *